July 5, 1966    H. L. CASSADAY ETAL    3,258,972
METHOD OF STRENGTHENING DELIVERY POINTS AND STEMS
OF LABORATORY GLASSWARE
Filed Nov. 1, 1963

INVENTOR.
HOWARD L. CASSADAY
ORMAN F. HOUSE
BY JAMES F. RYLEY
ATTORNEYS

3,258,972
METHOD OF STRENGTHENING DELIVERY POINTS AND STEMS OF LABORATORY GLASSWARE

Howard L. Cassaday and Orman F. House, Vineland, N.J., and James F. Ryley, Sylvania, Ohio, assignors to Owens-Illinois, Inc., a corporation of Ohio
Filed Nov. 1, 1963, Ser. No. 320,787
4 Claims. (Cl. 73—425.4)

This invention relates to a process of treating laboratory glassware of a type which is subject to fracture during use, to strengthen those portions of the glassware which are most susceptible to breakage.

More specifically, this invention relates to a process for treating points and stems of laboratory glassware, such as the delivery points of pipettes, which delivery points are susceptible of being chipped during use.

It has been the practice in the past to form pipettes and the like from tubing by heating a portion of the tubing and pulling the tubing to form a neck-down tapered end portion on the piece of tubing. This is one way in which the points of pipettes are formed and the excess pulled glass is cut from the point of the pipette and the end is then fire-polished. After the pipettes have been formed, the usual procedure is to anneal the entire pipette to remove all stresses in the glass.

Pipettes or other laboratory glassware made in accordance with the well-known process involving the reforming of tubing have a tendency, when dropped a short distance, point downward, to chip in the region of the point.

With the foregoing in mind, it is an object of this invention to provide a process for treating already formed pipette points and the like, to provide a compressive stress on the outside surface of the tip ends and part-way down the sides of the points and stems of laboratory glassware.

It is a further object of this invention to provide a process for heating and cooling the tip end only of pipettes so as to produce a stress corresponding to a maximum, total, optical retardation reading of 100 m$\mu$ to 250 m$\mu$ compression on the outside surface and tension on the inside surface.

It is an additional object of this invention to heat the tip end only of laboratory glassware above the strain temperature and then suddenly cool with air to produce compressive stress on the outside surface of the tip end of the article and tensile stress on the inside surface.

Other and further objects will be apparent from the reading of the following description taken in conjunction with the annexed sheet of drawing, wherein.

Figure 1:
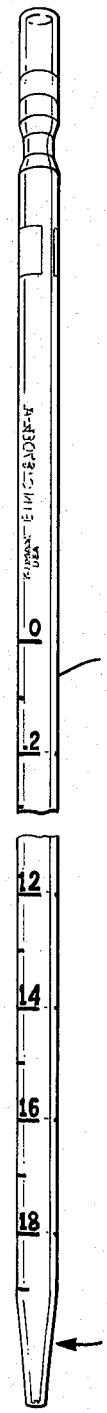
FIG. 1 is a perspective view of a serological pipette.

With reference to the drawing, it can be seen that a typical pipette, such as a serological pipette, shown in FIG. 1, takes the form of a relatively long piece of tubing 10, having its lower or delivery end 11 tapered inwardly. It is this lower or delivery end 11 which is of most concern from the standpoint of breakage.

It has been applicants' experience that in the use of pipettes a common accident involves the dropping of a pipette at its point or tip 11 downward against a hard surface, with the result that chips frequently are caused in the lowermost end of the tip end and when the chip extends into the lower surface 12 or into the bore 13 of the tip end of the pipette, the delivery rate of the pipette and the volume, without complete blow-out, is rendered inaccurate.

It can readily be appreciated that pipettes which are designed to deliver their contents without any assist do not clear the lower end of the bore 13 and if chips occur which extend into the bore, the volume of that amount of liquid which is retained within this bore by surface tension and capillarity is different than that which would be retained in an undamaged pipette.

Figure 2:
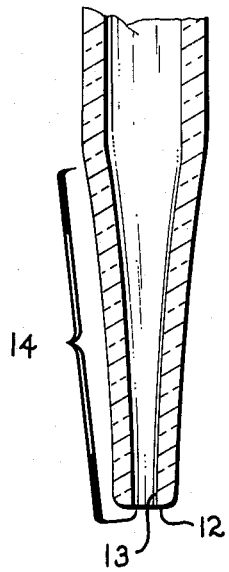
FIG. 2 is a vertical cross-sectional view of the tip end of a pipette.

In order to make pipettes more resistant to chipping, applicants have found that providing the pipette with a compressive stress in the outer surface of from 100 m$\mu$ to 250 m$\mu$ in the region 14 of FIG. 2 will greatly increase the durability of the pipette.

In particular, applicants have found that the strength of the pipette may be greatly increased by heating the delivery end portion 14 only, to a temperature above the annealing temperature for the glass out of which the pipette is constructed and then rapidly cooling the heated end to thus place the outer surface of the end in compression and the opposite or inside surface in tension.

Specifically, applicants place the tapered end 14 of the pipette in a heated zone, such as an oven, for a time sufficient to raise the temperature of the end portion above the annealing temperature of the glass and removing the pipette end from the heated zone and cooling immediately the heated end by circulation of air over the tip in a direction parallel to its axis.

Pipettes which have been heat conditioned in the manner indicated above, were found to be three to six times more chip-resistant than regular ground and bevelled and annealed tip ends. The increased chip resistance is expressed, as the increase in drop height possible before chipping occurs. The test consists of conditioning the pipette to simulate usage, then dropping samples at various heights onto a heavy glass plate and observing the sample's tendency to chip. A specific example, a glass presently used for forming pipettes, has an annealing point of 574° C., and it is this temperature above which the tip end of the pipette is heated. In fact, the temperature may be close to the softening point, for example, 795° C. for the particular glass which applicants are presently using.

As a specific example of a test conducted on a pipette which was heat treated in the manner outlined above, a serological pipette adapted to hold 1 ml. of liquid, when examined under a microscope was found to have compressive stress in the outside surface thereof extending around the tip end to a point just beneath the tip end in the bore of the pipette. The bore of the pipette, more specifically the surface of the bore of the pipette, was found to be in tension.

As is well known, if the tensioned surface is scratched, fracture of the glass part will occur. With this in mind, the inside surface of the pipette was scratched and fracture of the pipette occurred with the fracture beginning at a point .10″ above the end of the pipette. Examination of the fractured area indicated that the wall thickness of the pipette was .06″ with a bore diameter of .05″, making the total diameter in the area where the break occurred to be .17″. The compressive stress on the outer surface was found to be approximately .02″ in depth and extended around the tip end to a point where the bore of the pipette begins. The examination also indicated that the maximum, total, optical retardation reading due to the compressive stress in the outer wall of the pipette was of the order of 250 m$\mu$ and the maximum, total optical retardation reading due to the compensating tensile stress on the inside surface of the pipette was of the order of 180 m$\mu$.

It should be kept in mind that a finite zone of zero stress is formed internally of the glass intermediate the oppositely stressed surfaces.

The particular glass used to make pipettes has a stress-optical coefficient of 1.8 p.s.i./m$\mu$/in.

The optical retardation reading of 250 mμ may be equated with stress in p.s.i. by the well-known formula; stress in p.s.i. equals the optical retardation in millimicrons, multiplied by the stress-optical coefficient of the material, divided by the thickness through which the reading is taken.

In the particular case of the pipette tested the thickness through which the maximum, total stress reading was observed was .008 in.

This formula is disclosed in an article entitled "Polariscopic Examination of Glass Container Sections" in the Journal of The American Ceramic Society, vol. 27, No. 3, March 1944, at page 87.

The above data is given by way of specific example only, and it will be readily appreciated that pipettes or other laboratory apparatsu of different wall thicknesses and tapered end configurations may have stress patterns therein which differ somewhat from the specific data. However, the important consideration is that a compressive stress is formed on the outer tip end of the pipette and a tensile stress is formed on the inside. As pointed out above, the pipettes treated in this manner have superior impact strength when drop-tested in comparison with pipettes made in the usual manner that have been annealed to remove all or substantially all stress.

It will be readily appreciated that in order to achieve the optimum compression stress corresponding to a maximum retardation reading of from 100 mμ to 250 mμ on the outside surface of the glassware, it may be necessary to adjust the heating and cooling cycle, depending upon the thickness of the glass, the amount of heat retained by the glass during the time of its heating and other factors, such as composition which affect the annealing point. It should be readily appreciated that it is necessary that the pipette tip be heated above the annealing point and then rapidly cooled through the annealing point in order to set up the optimum stress in the tip end.

While the foregoing description has been primarily concerned with the explanation of how to strengthen the tip ends or delivery ends of pipettes, it should be readily appreciated that the process set forth above would have equal applicability to the conditioning of other laboratory glassware which has stems or ends which are susceptible to chipping in use so as to greatly strength the glassware.

We claim:

1. As an article of manufacture, a glass pipette having the tapered delivery end portion formed with a compressive stress in the outer surface corresponding to a maximum, total, optical retardation reading of from 100 mμ to 250 mμ and having a compensating tensile stress in the inside surface.

2. As an article of manufacture, a glass pipette having the tapered delivery end portion formed of precise contour and with a compressive stress in the outer surface corresponding to a maximum, total, optical retardation reading of from 100 mμ to 250 mμ and a compensating tensile stress in the inner surface and with the main body substantially free of all stresses.

3. In the method of forming pipettes and the like in which glass tubing is reheated and reshaped to form a pipette having a tapered delivery end and annealed to remove stresses therein; the added steps of heating the delivery end portion only to a temperature above the annealing temperature and then rapidly cooling the heated end to place the outer surface of the end in compression with a stress corresponding to a maximum, total, optical retardation reading in the range of from 100 mμ to 250 mμ and the inner surface in tension.

4. In the method of forming pipettes from glass tubing in which the tubing is reheated and pulled to form a tapered end, ground and bevelled and then annealed to remove substantially all stresses in the structure, the addtional steps of heating the tapered end above the annealing temperature by insertion of the end in a heated zone, then immediately upon removal from the heat, cooling the heated end by circulating air to form a compressive stress in the outer surface of the tip end which corresponds to a maximum, total, optical retardation reading in the range of 100 mμ to 250 mμ.

References Cited by the Examiner
UNITED STATES PATENTS 2,329,057 9/1943 Kiehl _____ 65—115 X
2,692,503 10/1954 Crecelius _____ 73—425.4

LOUIS R. PRINCE, *Primary Examiner.*

S. C. SWISHER, *Assistant Examiner.*